United States Patent
Wu et al.

(10) Patent No.: US 8,571,142 B1
(45) Date of Patent: Oct. 29, 2013

(54) SYSTEM AND METHOD FOR NON-CRYSTAL-BASED COMMUNICATIONS

(75) Inventors: Songping Wu, Cupertino, CA (US); Gang Liu, Fremont, CA (US); Daxiao Yu, Cupertino, CA (US); Yonghua Song, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 28 days.

(21) Appl. No.: 13/309,464

(22) Filed: Dec. 1, 2011

Related U.S. Application Data

(60) Provisional application No. 61/419,180, filed on Dec. 2, 2010.

(51) Int. Cl.
| | |
|---|---|
| *H04L 27/00* | (2006.01) |
| *H03D 3/00* | (2006.01) |
| *H04W 4/00* | (2009.01) |
| *H04B 7/00* | (2006.01) |
| *H04B 1/18* | (2006.01) |
| *H04B 1/28* | (2006.01) |
| *H04B 15/00* | (2006.01) |

(52) U.S. Cl.
USPC ........... 375/326; 375/324; 375/322; 375/316; 370/330; 370/329; 370/328; 370/310; 455/150.1; 455/130; 455/164.1; 455/333; 455/323; 455/313

(58) Field of Classification Search
USPC ............ 375/240; 370/330, 437, 468; 455/509
See application file for complete search history.

(56) References Cited

U.S. PATENT DOCUMENTS

| | | | | |
|---|---|---|---|---|
| 6,630,929 | B1* | 10/2003 | Adler et al. | 345/177 |
| 2005/0027890 | A1* | 2/2005 | Nelson et al. | 709/250 |
| 2009/0185646 | A1* | 7/2009 | Jo | 375/343 |
| 2010/0075704 | A1* | 3/2010 | McHenry et al. | 455/509 |
| 2010/0248631 | A1* | 9/2010 | Chaudhri et al. | 455/62 |

OTHER PUBLICATIONS

Alan Bensky, Short-range Wireless Communication, 2004, Elsevier, p. 35.*

* cited by examiner

*Primary Examiner* — Chieh M Fan
*Assistant Examiner* — Michelle M Koeth

(57) ABSTRACT

Systems and methods for using non-crystal-based reference oscillators in the transmission and reception of frequency-modulated signals are disclosed. To protect against intrusion on neighboring designated frequency bands, guard bands, having a collective width greater than the total expected error based on the contribution of the frequency error from the non-crystal-based oscillators in the transmitter and/or receiver, can be designated. To protect against inter-channel interference within a designated frequency band, transmitters and receivers can include static sub-bandwidths wider than any possible total frequency error, such that it would be impossible for a transmitter or receiver to attempt to communicate on an unintended sub-band. The determination of the total possible frequency error can be determined dynamically based on the correlation between a received training sequence and a known pattern before or a communication session to avoid or correct for frequency offset or drift due to the use of non-crystal-based reference oscillators.

14 Claims, 13 Drawing Sheets

SYSTEM AND METHOD FOR NON-CRYSTAL-BASED COMMUNICATIONS

CROSS REFERENCE TO RELATED APPLICATIONS

The present disclosure claims priority to U.S. Provisional Application. No. 61/419,180, filed on Dec. 2, 2010, which is incorporated herein by reference in its entirety for all purposes.

BACKGROUND

Particular embodiments generally relate to systems and methods for efficient and reliable electronic communication using non-crystal reference oscillators.

Unless otherwise indicated herein, the approaches described in this section are not prior art to the claims in this application and are not admitted to be prior art by inclusion in this section.

Electronic communication devices and systems can transmit and receive frequency-modulated signals using designated bands of the electromagnetic spectrum. To organize and manage the limited bandwidth in the spectrum, various government and non-government organizations around the world regulate the usage of the locally available spectra to avoid interference between signals being transmitted within various bands of the spectrum.

For example, in the United States, the Federal Communications Commission (FCC) has segmented the electro-magnetic spectrum into bands of frequency ranges for designated uses. FIG. 1 shows a section of the spectrum and a few of the designated usage bands. Television stations are regulated to transmit in channels typically located in the 400 MHz to 800 MHz frequency range, cellular mobile communication operators and users are regulated to use the frequencies in the range from approximately 800 MHz to 2000 MHz, while devices for local and near field networking, such as IEEE 802.11 protocols, commonly known as "WiFi," and Bluetooth operate in the 2.1 GHz to 5 GHz frequency range. Each of the ranges can be further separated into channels, i.e. smaller frequency ranges within the larger frequency ranges, centered on separated central frequencies that can be assigned to different users or entities or used by transmitting and receiving devices to send and receive signals without interfering with one another.

Since spectral bandwidth is a finite resource, regulating entities lease specific frequency bands subject to various rules and regulations to avoid unwanted interference between the leased bands. For example, such rules and regulations can require that any transmitter, using a particular leased frequency band or channel, transmits so that any signal intended to be transmitted and received on a specific channel remain within the designated frequency band. Similarly, users or devices transmitting in a particular frequency band, in order to efficiently and effectively use their designated or leased frequency band, try to reduce inter-channel interference by accurately transmitting and receiving signals at specific channels centered around a specific frequency.

FIG. 2 illustrates a conventional transmission system that is typically used to limit or prevent inter-channel interference. As shown in FIG. 2, an incoming bit stream 201 is received by transmitter $T_x$ 203 and converted into a frequency-modulated signal 204 center around 0 Hz to be transmitted over various wired and wireless electronic communication media. A multiplier 205 converts the base frequency-modulated signal 204 into a frequency-modulated signal centered on a central frequency of a particular channel. Multiplier 205 changes the base frequency-modulated signal 204 by a multiple of a reference frequency. The reference frequency is provided by an external reference oscillator 207.

Oscillators, such as external reference oscillator 207, are often based on highly stable and reliable crystal-based oscillators or resonators, such as quartz-based electrical oscillators. Such crystal-based oscillators have proven to be highly reliable sinusoid signal generators that can be referenced for the up-conversion or detection of signals at specific frequency channels. In the example shown in FIG. 2, multiplier 205 references the regular signal output by external crystal-based reference oscillator 207 to convert the base frequency-modulated signal 204 into the up converted frequency-modulated signal 209 center around 2.4 GHz.

While such crystal-based signal transmitters have been widely adopted as the standard mechanism for transmitting electronic communication signals, crystal-based signal transmitters are generally expensive and contribute to the increased size and complexity of electronic communication devices. As electronic communication becomes more prevalent in all walks of life, ranging from personal and commercial communication, such as voice and data networks, to global positioning systems, and wireless broadcasting, like FM radio and TV signals, economic and technical requirements to reduce the size, complexity, costs, and power consumption of transmitting and receiving devices alike, continue to increase.

To reduce the size, complexity, cost, and power consumption of electronic communication devices, external crystal-based reference oscillators can be replaced with on-board non-crystal-based reference oscillators, such as CMOS-based electrical oscillators. However, conventional non-crystal-based reference oscillators generally are not as stable and, consequently, not as accurate as crystal-based reference oscillators. Non-crystal-based reference oscillators typically suffer from frequency variations based on operating conditions, such as temperature and driving voltage, and therefore, using such oscillators in electronic communication systems and devices presents a number of drawbacks and deficiencies relative to the use of crystal-based reference oscillators.

SUMMARY

Embodiments are directed toward an apparatus for conducting communications over an electronic medium by scanning a frequency band channel-by-channel. The apparatus includes a processor, a non-crystal-based reference oscillator, an electronic communication interface, and a computer readable storage medium, each of which are coupled to the processor. The computer readable storage medium stores a predetermined signal or modulation pattern, as well as executable code that when executed by the processor implements a method for communicating over the electronic medium. The method implemented in the executable code includes determining an initial sub-band frequency width, and then dividing, based on an output of the non-crystal-based reference oscillator, a first frequency band of the electronic medium into a plurality of sub-bands, wherein each sub-band has a corresponding central frequency separated from a neighboring sub-band by the initial sub-band frequency width. Once the first frequency band is divided, method further includes receiving a data packet, transmitted by a transmitter. The data packet includes a training sequence transmitted at one of the plurality of sub-bands. The receiver can then determine a correlation between the training sequence contained in the data packet and the predetermined pattern stored in the computer readable storage medium.

Other embodiments are directed toward an apparatus for conducting communications over an electronic medium by monitoring multiple channels of a frequency band simultaneously. The apparatus includes a processor, a non-crystal-based reference oscillator, an electronic communication interface, and a computer readable storage medium, each of which are coupled to the processor. The computer readable storage medium stores a predetermined pattern and executable code that when executed by the processor implements a method for communicating over the electronic medium. The method implemented in the executable code includes determining an initial sub-band frequency width, and then dividing, based on an output of the non-crystal-based reference oscillator, a first frequency band of the electronic medium into a plurality of sub-bands, wherein each sub-band has a corresponding central frequency separated from a neighboring sub-band by the initial sub-band frequency width. The method also includes performing a Fourier transform function on the plurality of sub-bands and analyzing an output of the Fourier transform to determine communication activity on one or more of the plurality of sub-bands. The method further includes receiving a data packet including a training sequence and transmitted by a transmitter at one of the plurality of sub-bands. The method finally includes determining a correlation between the received training sequence contained in the data packet and the predetermined pattern stored in the computer readable storage medium.

Various other embodiments are directed toward methods for communicating over an electronic medium using a non-crystal-based reference oscillator. Such methods include storing a predetermined pattern to a computer readable storage medium. After determining an initial sub-band width, the method includes dividing, based on an output of the non-crystal-based reference oscillator, a first frequency band of the electronic medium into a plurality of sub-bands, each sub-band having a corresponding central frequency separated from a neighboring sub-band by the initial sub-band frequency width. The method further includes receiving a data packet, transmitted by a transmitter. The data packet includes a training sequence at one of the plurality of sub-bands. Finally, the method includes determining a correlation between the training sequence and the predetermined pattern stored in the computer readable storage medium.

The following detailed description and accompanying drawings provide a more detailed understanding of the nature and advantages of the present invention.

DETAILED DESCRIPTION

Figure 1:
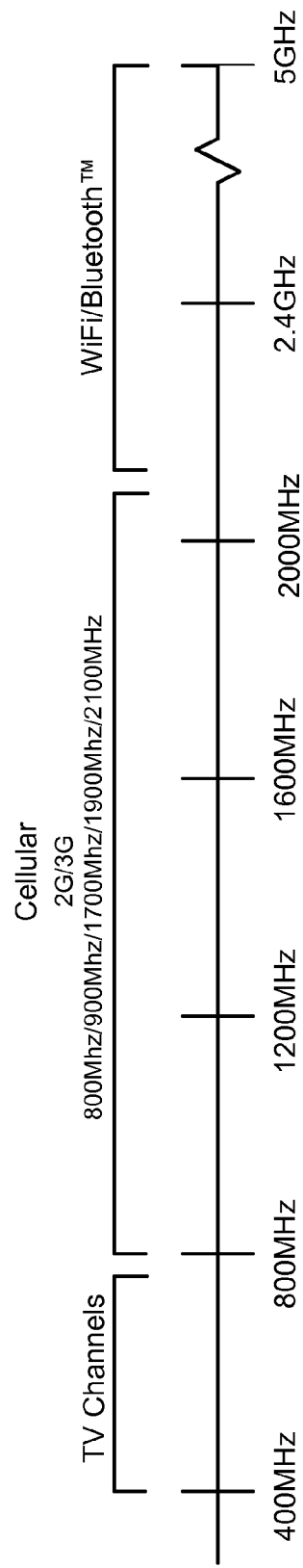
FIG. 1 is a representation of the electromagnetic spectrum as segmented and regulated by various agencies.
Figure 2:
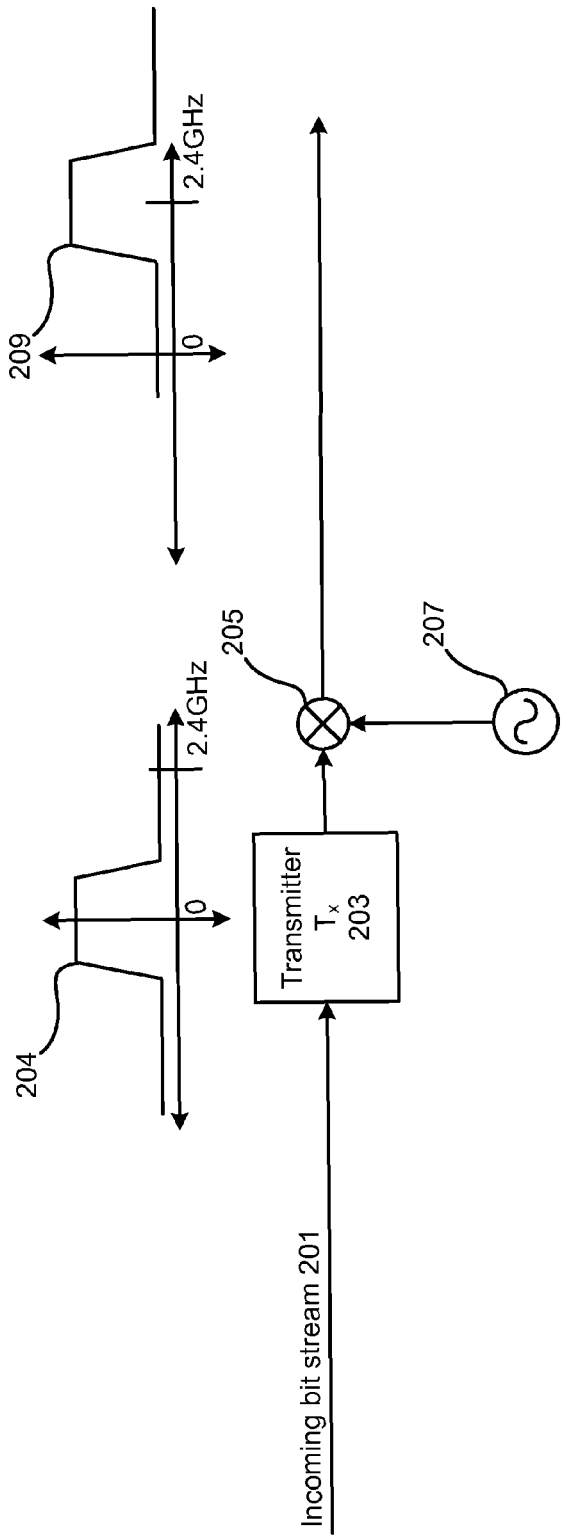
FIG. 2 is a schematic of a system that can be used for transmitting electronic communication signals.
Figure 3:
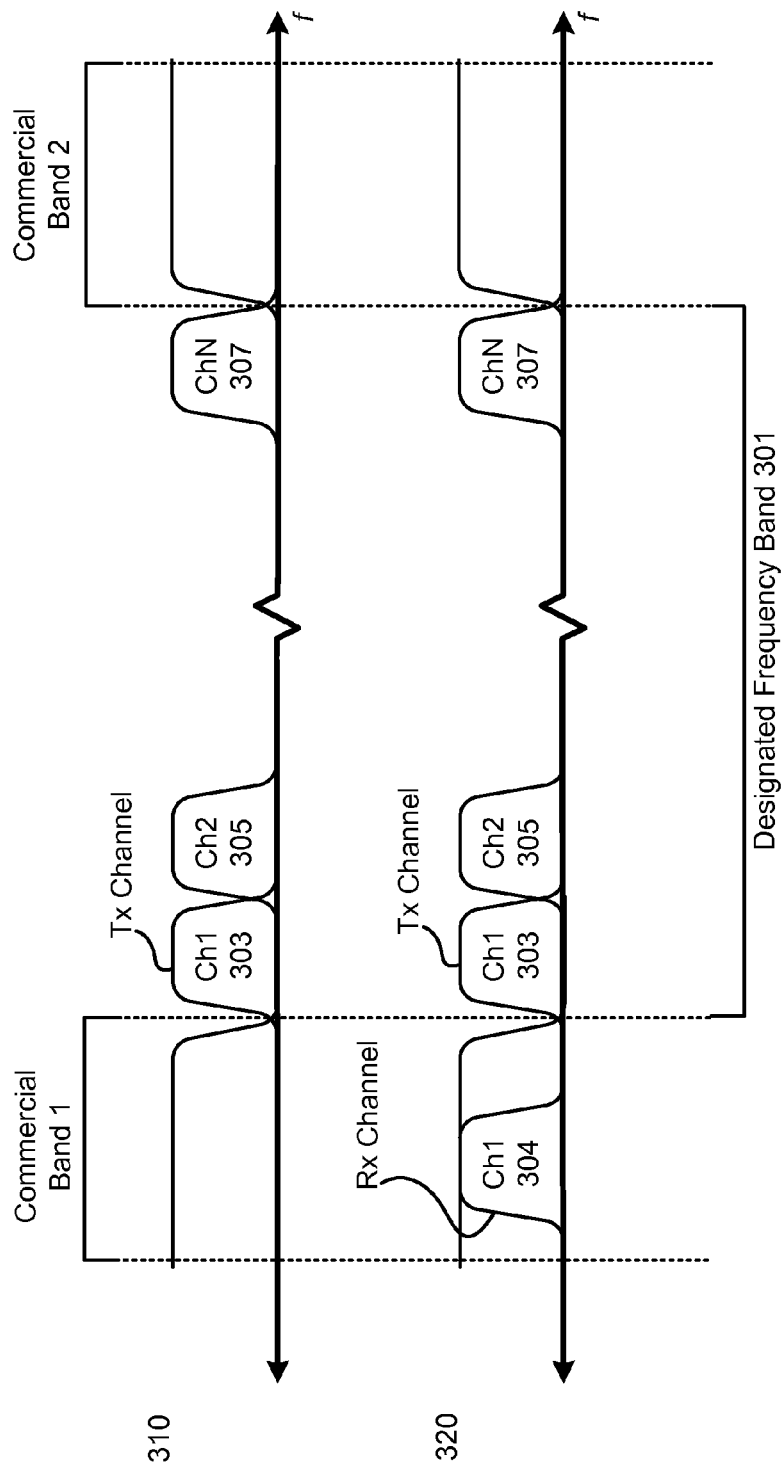
FIG. 3 is a comparison of the capabilities of crystal-based communication devices and non-crystal-based communication devices for transmitting and receiving electronic communications.

FIG. 3 shows a comparison of the transmission of a crystal-based transmitter and a non-crystal-based receiver within a designated frequency bandwidth 301. The designated frequency band 301 can be leased, auctioned, or licensed to specific entities for specific or general purposes. Use of such frequency bands can be licensed, such a television broadcasts and cellular networks, or unlicensed, as found in wireless local area networks (LANs). However, since the designated frequency bandwidth is regulated and can be auctioned off or leased in small bands, designated or leased frequency band 301 can be located between bands allocated for other uses or by other entities, such as commercial bands 1 and 2. A designated frequency band, such as designated frequency band 301 is usually separated into a number sub-bands, which can also be referred to as channels. As shown in FIG. 3, the designated frequency band 301 is divided into N channels, Ch1 303, Ch2 305 . . . ChN 307, each with a predetermined bandwidth.

Such close proximity among the bands of frequencies can present potential for spectrum regulation violations, interference, or intrusions with other spectral bandwidths when one entity transmits or attempts to receive signals on a channel or frequency outside of its own designated frequency band. For example, the scenario shown in scenario 310 illustrates how a transmitter with a crystal-based reference oscillator can accurately transmit a frequency-modulated signal on Tx Ch1 303 without interfering with the other channels or commercial bands 1 or 2. However, as shown in scenario 320, a receiver using a non-crystal-based reference oscillator with an inconsistent or unreliable reference signal, attempts to listen to the signal on Tx Ch1 303, at a Ch1 304, which is located in commercial band 1, thus violating the use of commercial band 1. Accordingly, the non-crystal-based receiver would not be able to detect, let alone receive, the signal sent on Tx Ch1 303 by the transmitter. Such problems are especially pronounced when the intended channel for transmission is located adjacent to a neighboring frequency band, as Tx Ch1 303 is to commercial band 1. Various embodiments are directed toward addressing such bandwidth violation.

Figure 4:
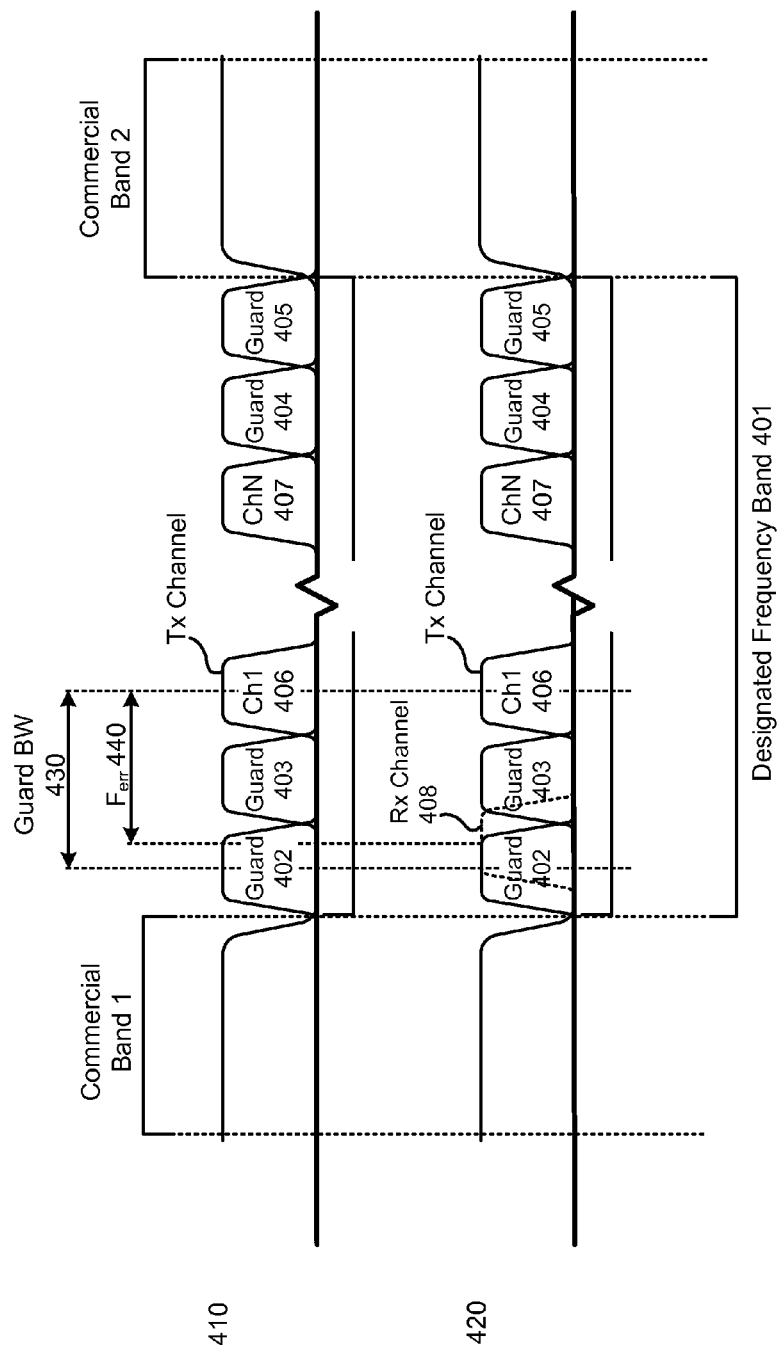
FIG. 4 illustrates a spectrum protection mechanism according to various embodiments.

FIG. 4 shows an implementation of spectral band protection according to various embodiments. In such embodiments, the transmitter and receiver are set up to transmit and receive electronic communications on N channels in the designated frequency band 401 situated between two bands of frequency ranges—commercial band 1 and commercial band 2. However, instead of locating Ch1 406 immediately adjacent to commercial band 1 and locating ChN immediately adjacent to commercial band 2, one or more guard channels 402, 403, 404, and 405 are designated as channels on which no signals should be expected to be transmitted or received. As shown, there are at least two guard channels, Guard 402 and Guard 403, between Ch1 406 and commercial band 1, as well as two guard channels, Guard 404 and Guard 405, located between Ch N and commercial band 2. While 4 guard channels are shown in FIG. 4, any number of guard channels can be defined. In one embodiment, the total width of the guard channels adjacent to each commercial band is greater than the worst possible frequency error possible due to the combined frequency error contributed by the transmitter and the receiver.

In the embodiments shown in FIG. 4, the width of the guard channels, as measured from the central frequency of guard channel 402 and Ch1 406, i.e. Guard BW 430 is greater than or equal to the total error contributed by the transmitter and the receiver. Thus, the number and width of the guard channels can be chosen to ensure that $F_{GUARD} >= F_{trx}$, is maintained, where $F_{GUARD}$ is the distance from central frequency of Ch1 406 to the central frequency of the first guard channel 402, and $F_{trx}$ is the maximum possible total frequency error contributed by the receiver and the transmitter. As shown in scenario 420 of FIG. 4, $F_{err}$ 440, the error due to the frequency error from the receiver, is less than Guard BW 430, so that when the receiver listens for the communication signal Ch1 408 at the frequency it believes corresponds to Ch1 406, there is no intrusion into commercial band 1. Accordingly, the guard bands guarantee that the transmission or reception on any channel of the designated frequency band does not intrude into any other protected bands.

Using non-crystal-based reference oscillators in the transmitters and receivers of communication systems can also present a number of issues regarding inter-channel interference. Based on the various permutations of crystal-based and non-crystal-based reference oscillators in the transmitters and receivers of a particular communication system, there are three specific scenarios that will be considered.

Figure 5:
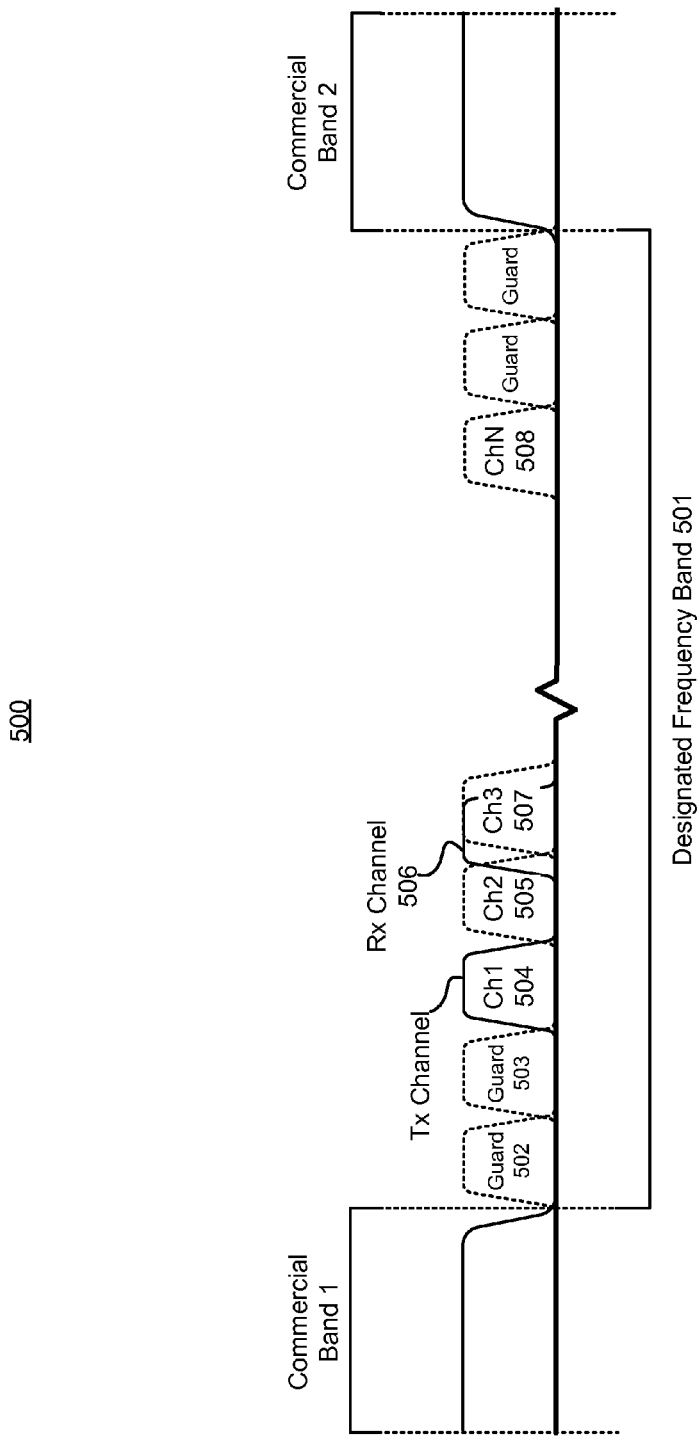
FIG. 5 illustrates an interference scenario between a crystal-based transmitter and a non-crystal-based receiver that can be addressed by various embodiments.

FIG. 5 illustrates with a scenario 500 including a crystal-based transmitter used with a non-crystal-based receiver and the inter-channel interference associated with using non-crystal-based reference oscillators in transmitters or receivers. In scenario 500, designated frequency band 501 is divided into a number of channels including guard channels 502 and 503, and usable channels Ch1 504, Ch2 505, and Ch3 507 to ChN 508. In scenario 500, the receiver uses a non-crystal-based reference oscillator that can provide an error-prone reference frequency signal when detecting a frequency-modulated signal. While the crystal-based transmitter reliably transmits a frequency-modulated signal on Tx channel Ch1 504, the error in the reference signal in the non-crystal-based receiver can cause the receiver to listen at Rx channel 506, which is at a frequency closer to Ch3 507. Because, the receiver would actually be listening for transmissions on the Ch3 507, instead of Ch1 504, this type error can be described as inter-channel interference. In such scenarios, the maximum offset, $F_{trx}$, is approximately $F_{rx}$, which is the offset in the attempted reception of the communication signal due to the frequency error in the non-crystal-based reference oscillator in the receiver.

Figure 6:
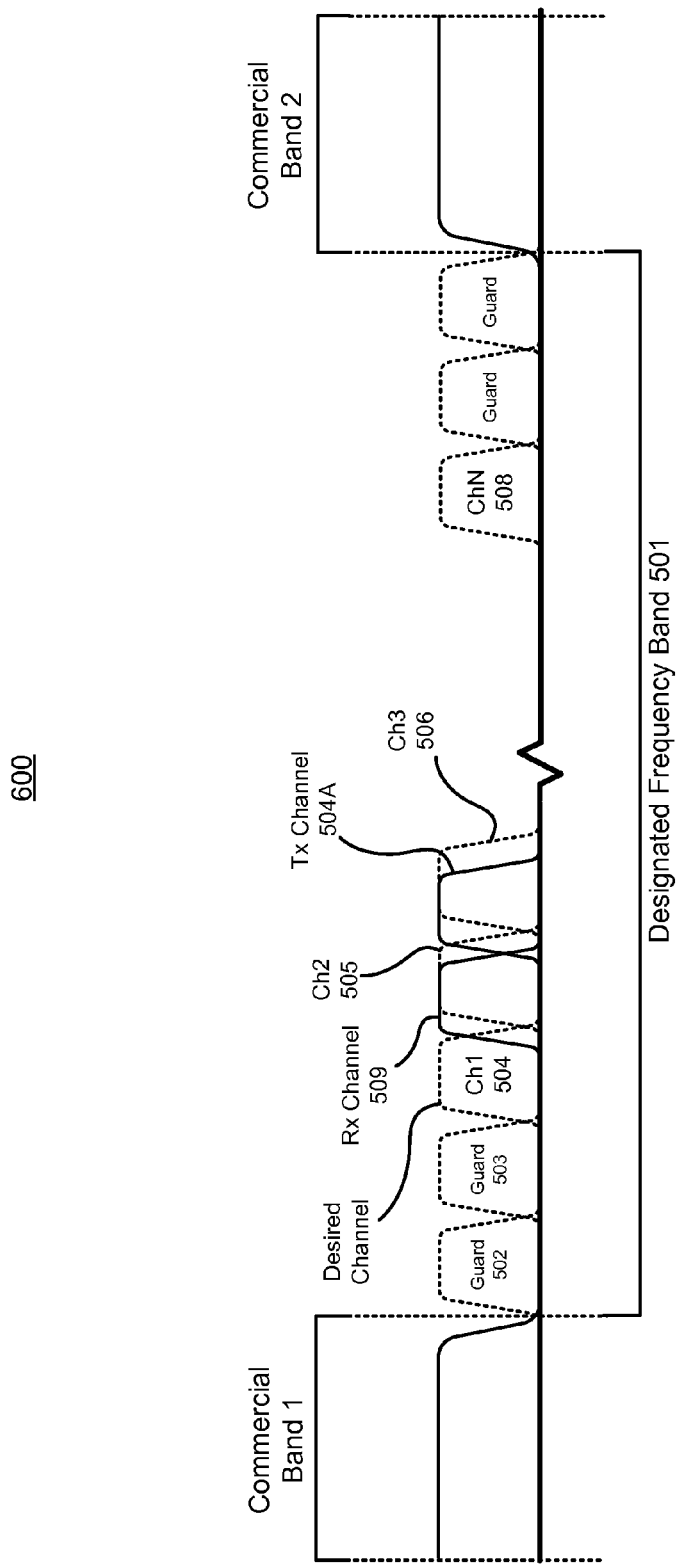
FIG. 6 illustrates an interference scenario between a non-crystal-based transmitter and a non-crystal-based receiver that can be addressed by various embodiments.

FIG. 6 illustrates scenario 600 in which a non-crystal-based reference oscillator is used in the transmitter and the receiver and where the errors from both must be considered. As shown in scenario 600, both the transmitter and receiver want to communicate at desired channel Ch1 504. However due to the frequency error in the transmitter's non-crystal-based reference oscillator, the transmission ends up being broadcast at Tx channel 504A, which is at a frequency closer to that of Ch3 506. Similarly, when the receiver, due to the frequency error in its own non-crystal-based reference oscillator, tries to receive the transmission at desired channel Ch1 504, the receiver is actually listening at Rx channel 509, which is closer to the frequency of Ch2 505. Assuming the worst possible frequency error from the transmitter and receiver are $F_{tx}$ and $F_{rx}$, respectively, then the maximum possible offset between the transmitting and receiving frequencies is $F_{trx} = F_{tx} + F_{rx}$. This type of inter-channel interference is worse than the inter-channel interference shown in FIG. 5 because now there is interference on Ch2 505 and Ch3 506.

Figure 7:
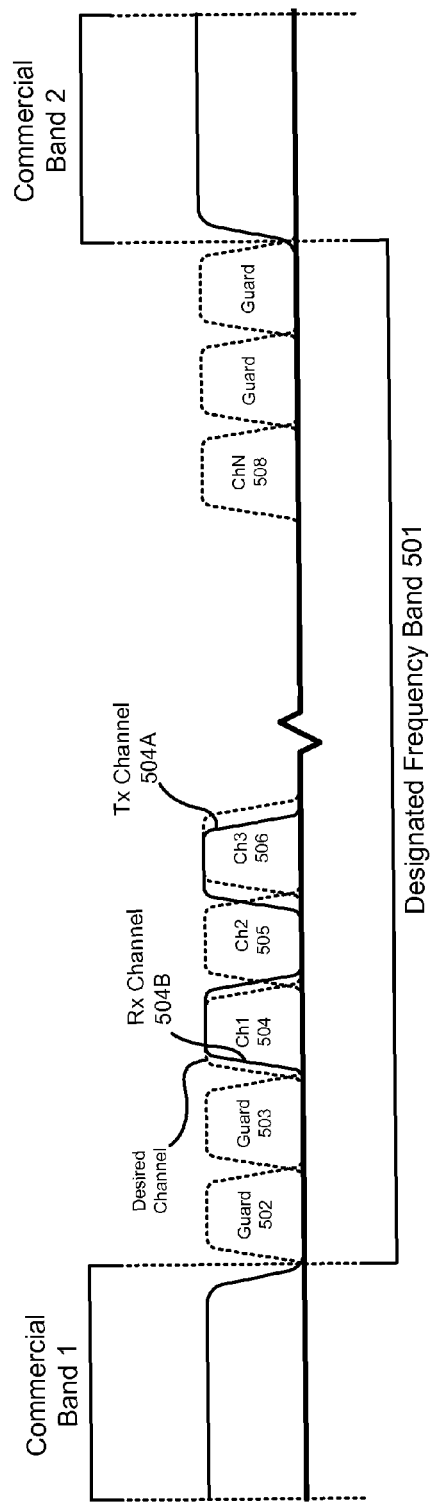
FIG. 7 illustrates an interference scenario between a non-crystal-based transmitter and a crystal-based receiver that can be addressed by various embodiments.

FIG. 7 shows a scenario 700 in which the transmitter uses a non-crystal-based reference oscillator and the receiver uses a crystal-based reference oscillator. In such a scenario, the transmitter is trying to transmit on desired channel Ch1 504, but due to the frequency error in the non-crystal-based reference oscillator, is actually transmitting at Tx channel 504A, which significantly offset from the frequency of the desired channel Ch1 504 and closer to the frequency of Ch3 506. Meanwhile the receiver, using a more accurate reference signal, attempts to listen for the communication signal at the Rx channel 504B at a frequency closer to the desired Ch1 504. In such scenarios, the maximum offset, $F_{trx}$, is approximately $F_{tx}$.

As discussed in the three scenarios above, the offset, or frequency drift, between the transmitted and received signals can be defined as $F_{trx}$, which can include the frequency errors contributed by the crystal-based and non-crystal-based reference oscillators in the transmitter and receiver. $F_{trx}$ can be advantageously compensated for or avoided using various embodiments of the present application.

Figure 8:
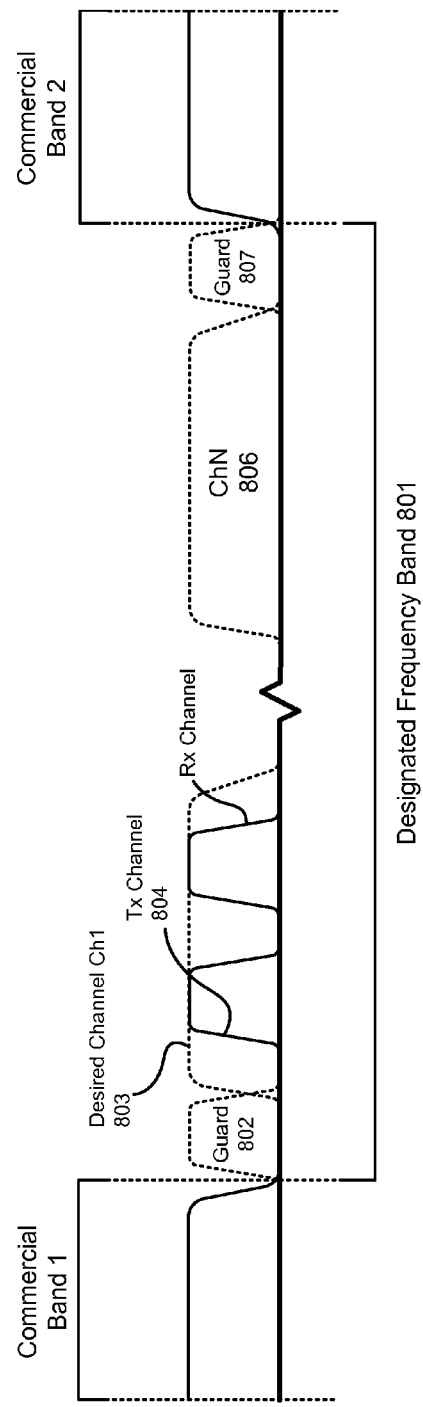
FIG. 8 illustrates a static inter-channel interference prevention scheme according to various embodiments.

For example, FIG. 8 illustrates a static interference prevention scheme according to various embodiments to prevent or compensate for inter-channel interference caused by large values of $F_{trx}$. As shown, the static interference prevention scheme defines Channel 1 803 through ChN 806 with bandwidths sufficiently wide to accommodate the largest possible offset between the Tx channel 804 and the Rx channel 805 and includes guard channels 802 and 807 to avoid possible intrusion into neighboring commercial bands 1 and 2. This scheme specifies that the spacing between channels, $F_{SPACING}$, be greater than the signal bandwidth or channel width, $F_{BW}$, and total frequency error due to the non-crystal-based reference oscillators in the transmitter and receiver, $F_{trx}$, such that $F_{SPACING} >= F_{BW} + F_{trx}$, is maintained at all times. Accordingly, any 2 neighboring channels in such embodiments must have a distance between central frequencies that is greater than or equal to $F_{SPACING}$.

While such embodiments are not the most efficient use of the designated frequency band 801, it does effectively solve the problem of inter-channel interference and band intrusion without requiring complex or powerful processing resources. Other possible inter-channel interference prevention schemes include dynamic solutions described below.

Figure 9:
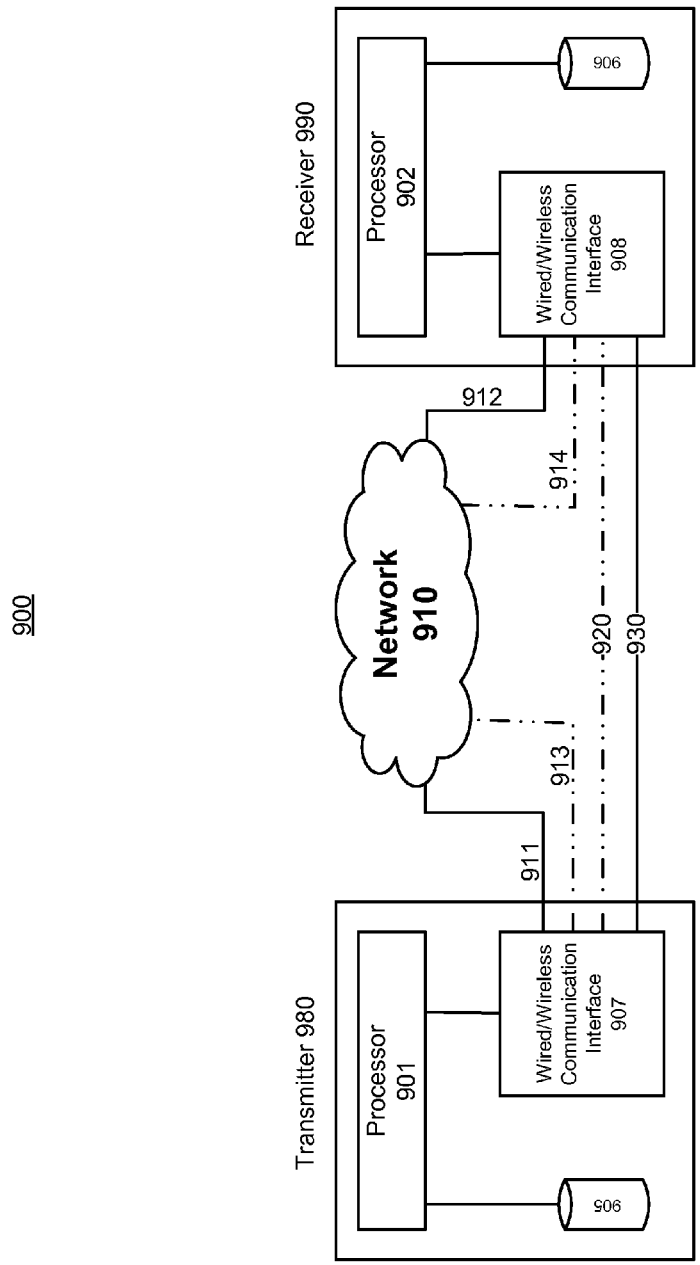
FIG. 9 is a schematic representation of a system for electronic communications that can be used to implement various embodiments.

FIG. 9 shows a system 900 that can be used to implement various embodiments. As discussed above, the system can include a transmitter 980 and a receiver 990 communicating over direct connections, such as wireless connection 920 and wired connection 930, or indirect connections, such as wired connection 911 or wireless connection 913 through network 910, to wired connection 912 or wireless connection 914. Each of such wired or wireless connections can be implemented in various proprietary and open standard communication protocols such as Ethernet, Wi-Fi, WiMAX, CDMA, GSM, GPRS, 3G/4G, LTE, Edge, etc. Various embodiments can be implemented using legacy, contemporary and future communication protocols without deviating from the spirit or scope of the present application.

As shown, transmitter 980 can include a processor 901 coupled to a wired/wireless communication interface 907 and a non-transitory computer readable storage medium 905. The non-transitory computer readable storage medium 905 can be used to store various computer executable code or instructions for operating processor 901 to receive an incoming bit stream and convert the bitstream to a frequency-modulated signal to be transmitted on a particular channel via one or more of connections 911, 913, 920, or 930.

Similarly receiver 990 can include a processor 902 coupled to a wired/wireless interface 908 and a non-transitory computer readable storage medium 906. The non-transitory computer readable medium can be used to store various computer executable instructions for operating processor 902 to detect and receive incoming frequency-modulated signals from one or more transmitters over connections 912, 914, 920, or 930, and convert such signals into an outgoing bit stream. In various embodiments, each of transmitter 980 and receiver 990 can transmit and receive frequency-modulated signals, and as such, can be considered transceivers.

During the process of sending and receiving frequency-modulated signals, transmitter 980 and receiver 990 can be coupled to and/or reference an internal or external crystal-based or non-crystal-based oscillator or frequency generator. In some such embodiments, the oscillators provide a sinusoidal signal. However as discussed above, non-crystal-based oscillators can suffer from significant frequency error based on operating conditions and therefore can produce offsets in the resulting transmitted or received frequency-modulated signal away from the intended frequency bandwidth or channel that can cause inter-channel and inter-band interference or intrusions. One method for avoiding such interference, according to an embodiment of this application, includes a dynamic interference prevention or on-the-fly detection/avoidance procedure.

Figure 10:
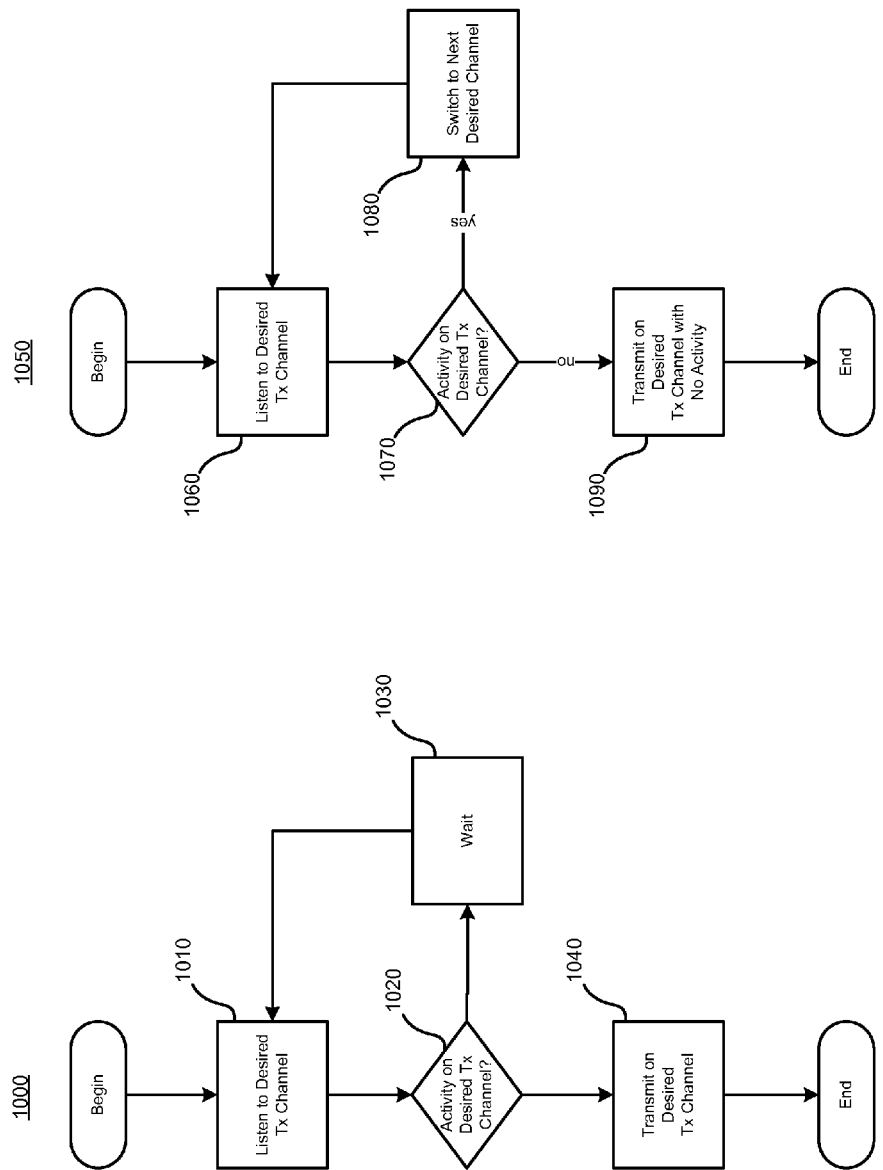
FIG. 10 is a flowchart of listen-before-talk methods for transmitting electronic communications used by various embodiments.

As a matter of background, FIG. 10 shows two flowcharts respectively corresponding to methods 1000 and 1050 that can be used by a transmitter before beginning transmission on a particular transmission channel. Method 1000 can begin when the transmitter is initiated to transmit a particular frequency-modulated signal over one or more communication media. The transmitter, at step 1010, can listen in on the desired transmission channel, and at step 1020 can determine if there is any activity on the desired transmission channel. If there is activity on the desired transmission channel, the transmitter can wait a predetermined period of time in step 1030 and then return to step 1010 again to listen to the desired transmission channel. If the transmitter decides in step 1020 that there is no activity on the desired transmission channel, then the transmitter begins transmission on the desired transmissions channel at step 1040 and the process ends.

Method 1050 can also be used by a transmitter when the transmitter receives a command to begin transmitting a frequency-modulated signal. However in such methods, the transmitter does not necessarily need to be directed to transmit over a particular transmission channel, but instead can be instructed to use any available transmission channel within a designated frequency band. At step 1060 the transmitter listens to an initially desired transmission channel and decides at step 1070 if there is any activity on that initially desired transmission channel. If there is activity on the desired transmission channel, then the transmitter, at step 1080 switches to the next transmission channel in the designated frequency band and again listens at step 1060. This process can repeat until the transmitter finds a transmission channel on which there is no activity and begins to transmit the frequency-modulated signal on the desired transition channel with no activity at step 1090 until the transmission ends. Both methods 1000 and 1050 can be implemented in software, firmware, hardware or combination thereof.

In a corresponding operation in an intended receiver, the receiver can scan a number of frequencies and receive corresponding transmission packets following a prior arrangement or agreement, such as, packet ID definitions, the device ID definitions, or protocols defined by the network or medium over which the frequency-modulated signals are being transmitted to determine the estimated frequency error, $F_{trx}$. In such embodiments, the transmitter can transmit predetermined training sequences or signals that can be used by the receiver to identify the expected signal. In other embodiments, the training sequence can be omitted and the receiver can use the form or protocol of the expected signal to identify the expected signal. Such identification can be referred to as autocorrelation or blind correlation of an expected data form or signal modulation pattern, which can then be used to determine the total frequency error or drift, $F_{trx}$.

Figure 11:
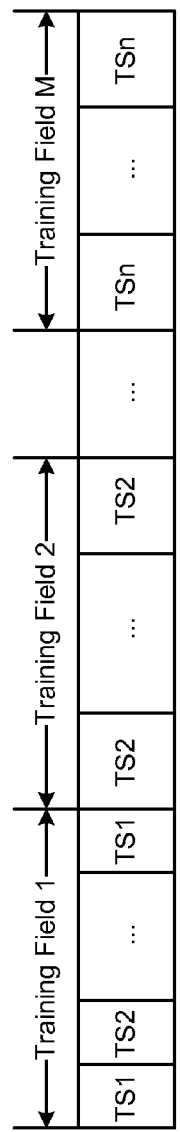
FIG. 11 is a representation of a data structure that can be used with dynamic inter-channel interference prevention schemes according to various embodiments.

One such frequency error estimation protocol to estimate and to correct for frequency error in a transmitted frequency-modulated signal can include a data structure 1110 represented in FIG. 11. The data structure 1110 can be used in a frequency estimation protocol for non-crystal-based communication systems for aligning the frequencies used by various transmitters and receivers. Such estimation, according to various embodiments, can be carried out in analog, digital or mixed modes. Additionally, such estimation can be performed when a device, such as a transmitter or receiver, listens in on a particular channel prior to or during its attempt to transmit or receive a signal. The initialization of such listening can be periodic and can be controlled by the media access code (MAC) or software. Estimation can be performed on a per session basis or a per link basis, such that each device can maintain a table to record the relative frequency error for a specific link to one or more individual partner devices.

For example, a receiver can maintain a listing of transmitters, according to some transmitter identifier (ID) or name, so that each time the receiver receives, or expects to receive, a transmission from a particular transmitter, the receiver can reference the table to determine where in the designated frequency band the receiver should expect to such detect the transmission.

According to various embodiments, frequency error estimation methods can include one of or combinations of different types of signal processing. For example, each device can use a one-shot type process, such as a wideband correlation between a received signal and a known pattern. Alternatively, each device can use a multi-shot serial type process by scanning each of a number of frequencies or channels sequentially until the device detects a signal or sequence which correlates with a known pattern. Finally, according to other embodiments, each device can use a multi-shot parallel type process by performing a Fourier transform and looking at all possible frequencies simultaneously for a particular known pattern. For each link, the estimation process can be performed using multiple steps or gear shifting the balance between convergence speed, (course tuning), and accuracy, (fine tuning).

To include a known pattern into the transmission of a frequency-modulated signal, the transmitter can use a number of training fields shown in FIG. 11. Each training field can include a number of training sequences in various patterns and combinations. For example training field 1 can include a training sequence 1 (TS1), followed by training sequence 2 (TS2), which can be repeated for some number occurrences. Each of the training sequences can correspond to a pattern known by the intended receiver. Accordingly, when an estimation protocol is activated, either in an initialization or update process to account for the initial offset, or a subsequent drift caused by process, voltage and temperature (PVT) variations, the receiver can detect one of the training sequences in the transmission to determine where the modulated signal should be expected to be found within the designated frequency band, and thereby record a corresponding frequency offset for that particular transmitter from which the transmission was received. Even though the training fields are shown to be adjacent in FIG. 11, various embodiments of the present application include inserting various training sequences and training fields before, inside, and after transmitted data packets. Similarly, the data structure shown in FIG. 11 can be used as part of the initialization process when receiving a transmission from a newly recognized transmitter, but can also be used in an update process which occurs after initialization to account for frequency drift as one or more of non-crystal-based reference oscillators changes it operations due to operating conditions, i.e. temperature or driving current or voltages.

Such update process can be activated by software based on a number of factors including, but not limited to, a predetermined or dynamically determined periodic timer, or significant changes due to PVT detected by a sensor or any detection circuitry in the transmitter or receiver which would thereby activate the update process. The update process can be carried out with the specific calibration signal received in a training sequence or carried out during operation using the data itself with or without data packet headers. Initialization type processes and update type processes are suitable for both burst transmission systems, such as packet-based systems, or for continuous transmission systems, such as a broadcasting system. While training sequences can help accelerate the frequency error estimation process, training sequences are not required by various embodiments of the present application.

Figure 12:
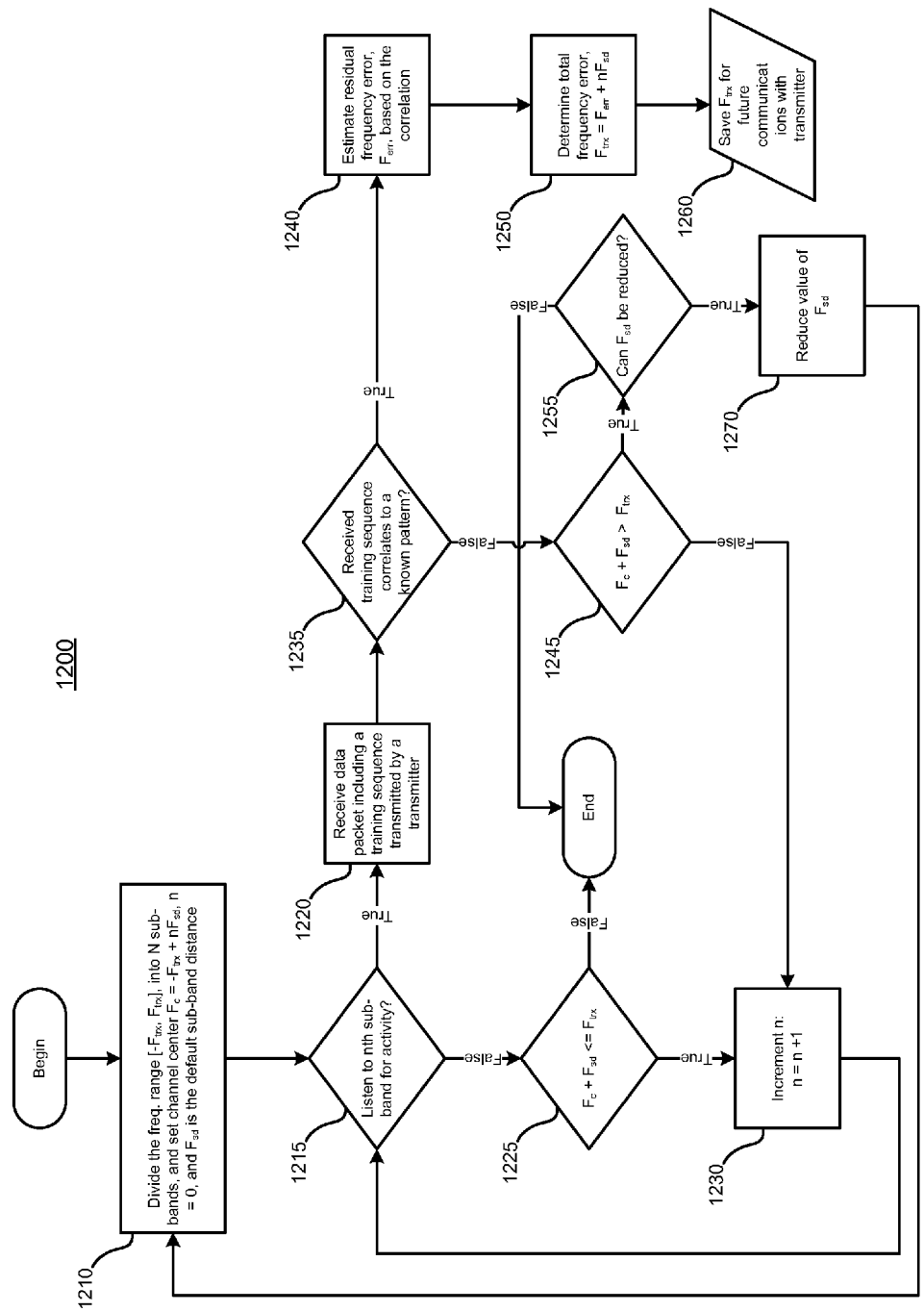
FIG. 12 is a flowchart of a method for receiving electronic communications using interference avoidance according to various embodiments.

FIG. 12 shows a flowchart of a method 1200 for estimating the total frequency offset, $F_{trx}$, according to various embodiments. The method 1200 can be initiated independently by the receiver or once the receiver detects a transmitter has transmitted a packet on one or more channels. The method can begin at step 1210 in which the device, in this example, the receiver, divides the frequency range defined as $[-F_{trx}, F_{trx}]$ into N sub-bands and sets the center frequency of each of the channels, $F_c = -F_{trx} + nF_{sd}$, where n is initially set to 0, and $F_{sd}$ is the default sub-band distance between channels within the designated frequency band. According to method 1200, at step 1215, the device can listen to the $n^{th}$ sub-band for activity. However, if there is no activity, and $F_c + F_{sd} <= F_{trx}$, according to step 1225, then n can be incremented by 1 in step 1230, and the device can listen again at a channel centered on $F_c = -F_{trx} + (n+1)F_{sd}$. This process including steps 1215, 1225, and 1230 can repeat until all the channels have been scanned and a data packet with a training sequence is found or until the entire designated frequency band has been scanned and exhausted. Method 1200 can be augmented to scan the entire designated frequency band continually or to scan the entire designated frequency band a finite number of times before declaring a failure.

If there is activity on the $n^{th}$ sub-band, the device can receive a data packet that may include a training sequence transmitted by a transmitter at step 1220. At step 1235, the device determines whether not the received data packet includes a training sequence that correlates to a known pattern. If the received training sequence includes a known pattern, the device can then estimate the residual frequency error, $F_{err}$, based on the correlation between the received training sequence and the known pattern at step 1240. At step 1250, the total frequency error can be estimated as $F_{trx} = F_{err} + nF_{sd}$, where n is the number of the channel on which the received training sequence was received. The total frequency error $F_{trx}$ can then be saved for future communication with the transmitter from which the training sequence was received, in step 1260.

If, however, at step 1235, the device determines that there is no training sequence in the received data packet or if the received training sequence does not correlate to a pattern known by the device, the device can decide to continue scanning through the available channels as long as $F_c + F_{sd} > F_{trx}$ is determined to be false at step 1245. If $F_c + F_{sd} > F_{trx}$ is determined to be true at step 1245, then the device needs to decide, based on one or more protocol guidelines or rules if the width of $F_{sd}$ can be reduced in step 1255. If $F_{sd}$ can be reduced, then the device can reduce the value of $F_{sd}$ in step 1270 and restart the process at step 1210 with the new value for $F_{sd}$, and reinitializes n=0.

If it is determined in step 1255 that $F_{sd}$ cannot be reduced, then the process can be declared a failure and the process ends. As discussed above, all or part of method 1200 described in FIG. 12 can be used in cooperation with a single shot estimation, as described in reference to FIG. 9, or the multi-shot serial estimation represented method 1200.

In such embodiments, the training sequence that can be included in a data packet or sent separately from the data packet can contain data or patterns to avoid interference specific to the intended communication session to avoid any confusion with other communication devices, networks or sessions. Each training sequence can be interleaved between data packets, sent sequentially, or the two configurations can be mixed or alternated depending on the application and level of accuracy needed in the frequency error estimation or pattern correlation. In such embodiments, the training session or pattern can be specific or unique to the communication session or the communication entities, such as the transmitter or receiver. This further helps the transmitter or receiver save time for future communication once the total frequency error or offset is determined by allowing each device to store a predetermined frequency error to communicate with some other device.

Figure 13:
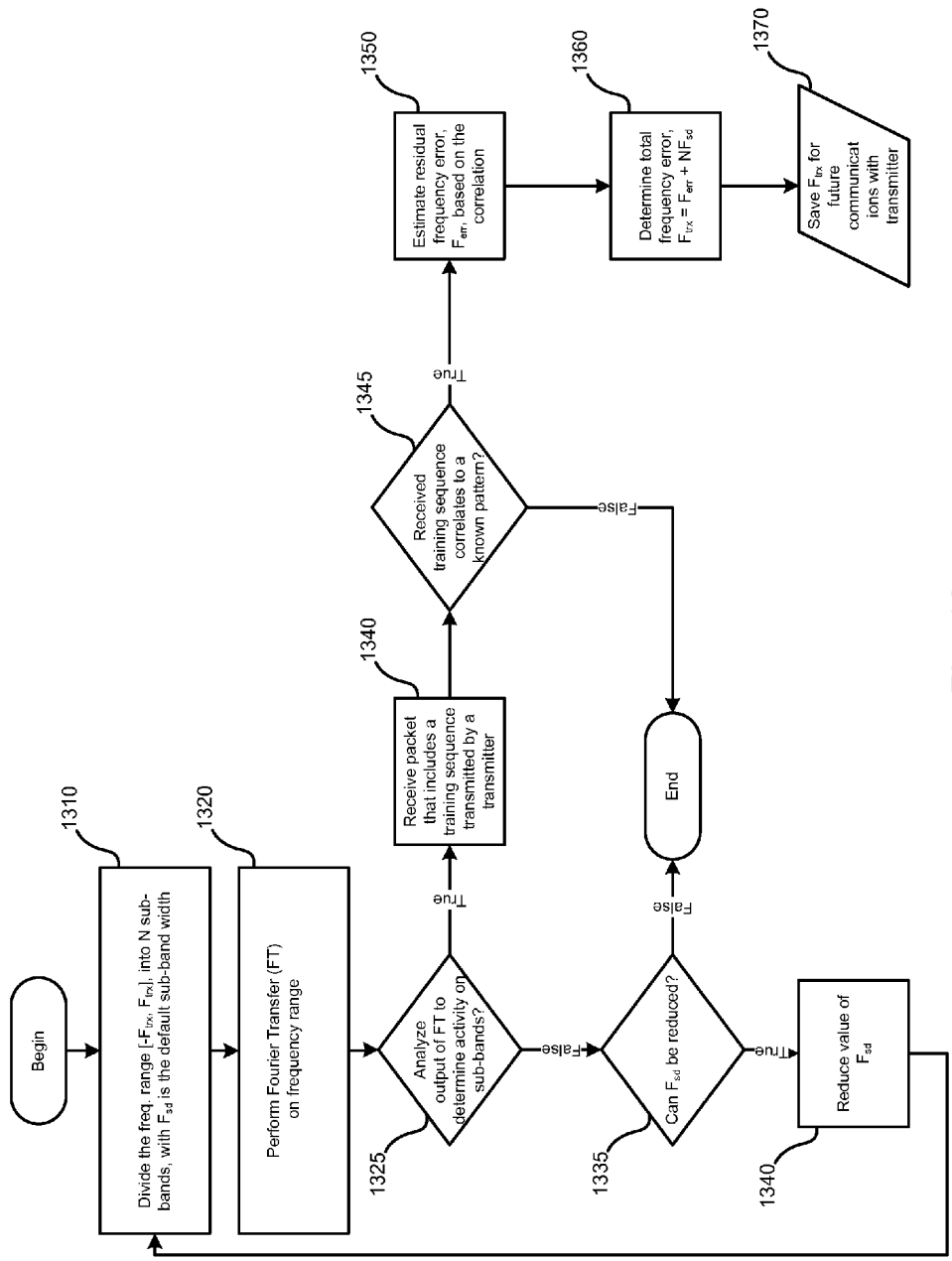
FIG. 13 is a flowchart of a method for receiving electronic communications using interference avoidance according to various embodiments.

FIG. 13 is a flowchart of a method 1300 with multi-shot parallel processing to estimate total frequency error according to various embodiments. In such embodiments, the method 1300 begins with the device dividing the designated frequency range, $[-F_{trx}, F_{trx}]$ into N sub-bands separated by $F_{sd}$ as the default sub-band distance between channels within the designated frequency band, in step 1310. The device can then perform a Fourier transform of the entire designated frequency range in step 1320. The device can then analyze the output of Fourier transform to determine if there is any activity on any of the sub-bands in a single step 1325. As with the method 1200 described above in reference to FIG. 12, the determination that there is activity on one or more of the sub-bands can be determined with an energy detection mechanism or method.

If the device does not determine or detect any activity based on any of the sub-bands based on the output of Fourier transform, the device can then determine whether or not $F_{sd}$ can be reduced to a smaller value to provide finer granularity at step 1335, according to various communication protocols, rules, and guidelines. If it is determined at step 1335 that $F_{sd}$ can be reduced, then $F_{sd}$ is reduced at step 1340, and the designated frequency band is again divided based on the new value of $F_{sd}$ at step 1310 and the process is repeated again until $F_{sd}$ can no longer be reduced to smaller sub-bandwidths.

If, however, the output of Fourier transform indicates that there is some activity on one or more of the sub-bands in the determination at 1325, then the device can receive a packet that may include a training sequence transmitted by a transmitter at step 1330. At step 1345, the device can determine whether or not the data packet and/or receive training sequence correlates to a known pattern expected from a particular transmitter. If the data packet and/or training sequence received from the transmitter does not correlate to a known pattern, then the process can be declared a failure and the method ends. In some embodiments, the method 1300 can be repeated periodically or when initiated by an internal or external piece of software, firmware, or hardware, to determine whether or not there is any activity on any sub-band of the designated frequency band.

On the other hand, if the device determines at step 1345 that the received training sequence correlates to a known pattern expected from a particular transmitter or communication system, then the device can estimate the residual frequency error, $F_{err}$, for that particular transmitter or communication network based on the correlation between the known pattern and the receives training sequence, at step 1350. Once the residual frequency error is estimated in step 1350, the device can then determine a total frequency error, $F_{trx}=F_{err}+NF_{sd}$, at step 1360 and then save $F_{trx}$ for future communication sessions with that particular transmitter or communication network.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Particular embodiments as defined by the claims may include some or all of the features in these examples alone or in combination with other features described above, and may further include modifications and equivalents of the features and concepts described herein. Based on the above disclosure and the following claims, other arrangements, embodiments, implementations and equivalents may be employed without departing from the scope of the invention as defined by the claims.

What is claimed is:

1. An apparatus for conducting communications over an electronic medium, the apparatus comprising:
    a processor;
    a non-crystal-based reference oscillator coupled to the processor;
    an electronic communication interface coupled to the processor; and
    a computer readable storage medium coupled to the processor, the computer readable storage medium storing a predetermined pattern, the computer readable storage medium further comprising executable code that when executed by the processor implements a method for communicating over the electronic medium, wherein the method comprises
    determining an initial sub-band frequency width,
    dividing, based on an output of the non-crystal-based reference oscillator, a first frequency band of the electronic medium into a plurality of sub-bands, wherein each sub-band has a corresponding central frequency separated from a neighboring sub-band by the initial sub-band frequency width,
    receiving a data packet, transmitted by a transmitter, the data packet including a training sequence at one of the plurality of sub-bands,
    determining a correlation between i) the training sequence contained in the data packet and ii) the predetermined pattern stored in the computer readable storage medium,
    estimating a residual frequency error in response to the correlation, and
    calculating a total frequency error comprising i) the initial sub-band frequency width and ii) the residual frequency error.

2. The apparatus of claim 1, wherein the method further comprises designating at least one of the plurality of sub-bands as a guard band.

3. The apparatus of claim 1, wherein the method further comprises storing the total frequency error to the computer readable storage medium.

4. The apparatus of claim 3, wherein storing the total frequency error to the computer readable storage medium comprises relating the total frequency error to the transmitter from which the data packet was received.

5. The apparatus of claim 4, using the stored total frequency error to receive additional data packets from the transmitter at the one or another of the plurality of sub-bands of the electronic medium.

6. A system comprising the apparatus of claim 1.

7. An apparatus for conducting communications over an electronic medium, the apparatus comprising:
    a processor;
    a non-crystal-based reference oscillator coupled to the processor;
    an electronic communication interface coupled to the processor; and
    a computer readable storage medium, coupled to the processor, the computer readable storage medium storing a predetermined pattern, the computer readable storage medium further comprising executable code that when executed by the processor implements a method for communicating over the electronic medium, wherein the method comprises
    determining an initial sub-band frequency width,
    dividing, based on an output of the non-crystal-based reference oscillator, a first frequency band of the electronic medium into a plurality of sub-bands, wherein each sub-band has a corresponding central frequency separated from a neighboring sub-band by the initial sub-band frequency width,
    performing a Fourier transform function on the plurality of sub-bands,
    analyzing an output of the Fourier transform to determine communication activity on one or more of the plurality of sub-bands,
    receiving a data packet, transmitted by a transmitter, the data packet including a training sequence at one of the plurality of sub-bands,
    determining a correlation between i) the received training sequence contained in the data packet and ii) the predetermined pattern stored in the computer readable storage medium, estimating a residual frequency error in response to the correlation, and calculating a total frequency error comprising i) the initial sub-band frequency width and ii) the residual frequency error.

8. The apparatus of claim 7, wherein the method further comprises storing the total frequency error to the computer readable storage medium.

9. The apparatus of claim 8, wherein storing the total frequency error comprises relating the total frequency error to a transmitter or communication network identifier.

10. A method for communicating over an electronic medium using a non-crystal-based reference oscillator, the method comprising:

storing a predetermined pattern to a computer readable storage medium;

determining an initial sub-band distance;

dividing, based on an output of the non-crystal-based reference oscillator, a first frequency band of the electronic medium into a plurality of sub-bands, each sub-band having a corresponding central frequency separated from a neighboring sub-band by the initial sub-band distance;

receiving a data packet, transmitted by a transmitter, the data packet including a training sequence at one of the plurality of sub-bands;

determining a correlation between i) the training sequence and ii) the predetermined pattern stored in the computer readable storage medium;

estimating a residual frequency error in response to the correlation; and calculating a total frequency error comprising i) the initial sub-band distance and ii) the residual frequency error.

11. The method of claim 10, further comprising designating at least one of the plurality of sub-bands as a guard band.

12. The method of claim 10, further comprising storing the total frequency error to the computer readable storage medium.

13. The method of claim 12, wherein storing the total frequency error to the computer readable storage medium comprises relating the total frequency error to the transmitter from which the data packet was received.

14. The method of claim 13, further comprising using the stored total frequency error to receive additional data packets from the transmitter at the one or another of the plurality of sub-bands of the electronic medium.

* * * * *